US 9,244,466 B2

(12) United States Patent
DuPlessis et al.

(10) Patent No.: US 9,244,466 B2
(45) Date of Patent: Jan. 26, 2016

(54) ELECTRONIC MIXING VALVE IN STANDARD HOT WATER HEATER

(71) Applicant: GENERAL ELECTRIC COMPANY, Schenectady, NY (US)

(72) Inventors: Samuel DuPlessis, Lousiville, KY (US); Thomas Zimmer, Louisville, KY (US)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 13/893,858

(22) Filed: May 14, 2013

(65) Prior Publication Data

US 2014/0026970 A1    Jan. 30, 2014

Related U.S. Application Data

(60) Provisional application No. 61/675,014, filed on Jul. 24, 2012.

(51) Int. Cl.
*G05D 23/13* (2006.01)
*F24H 9/20* (2006.01)
*F24D 17/00* (2006.01)
*F24D 19/10* (2006.01)

(52) U.S. Cl.
CPC .......... *G05D 23/132* (2013.01); *F24D 17/0031* (2013.01); *F24D 19/1051* (2013.01); *F24H 9/2021* (2013.01); *G05D 23/1393* (2013.01); *Y10T 137/0329* (2015.04)

(58) Field of Classification Search
CPC . G05D 23/13; G05D 23/1306; G05D 23/132; G05D 23/134; G05D 23/1346; G05D 23/1353; G05D 23/1366; G05D 23/1373; G05D 23/1393; F24D 19/1051
USPC ................ 236/12.1, 12.12, 12.15, 21 B, 25 R
See application file for complete search history.

(56) References Cited

U.S. PATENT DOCUMENTS

| 6,024,290 | A | * | 2/2000 | Dosani et al. | 236/12.12 |
| 6,270,014 | B1 | * | 8/2001 | Bollas et al. | 236/12.12 |
| 6,286,464 | B1 | * | 9/2001 | Abraham et al. | 122/14.31 |
| 6,286,764 | B1 | * | 9/2001 | Garvey et al. | 236/12.12 |
| 6,640,047 | B2 | | 10/2003 | Murahashi et al. | |
| 6,861,621 | B2 | * | 3/2005 | Ghent | 219/492 |
| 7,298,968 | B1 | * | 11/2007 | Boros et al. | 392/494 |
| 7,316,267 | B2 | * | 1/2008 | Kunimoto et al. | 165/240 |

FOREIGN PATENT DOCUMENTS

| EP | 1248052 B1 | 9/2011 |
| JP | 8271042 A | 10/1996 |

\* cited by examiner

*Primary Examiner* — Jonathan Bradford
(74) *Attorney, Agent, or Firm* — Dority & Manning, P.A.

(57) ABSTRACT

A hot water heater includes a hot water tank having a cold water inlet line and a hot water outlet line, an electronically controlled mixing valve fluid coupled to the cold water inlet line and the hot water outlet line and mixed output line and a controller operatively coupled to the mixing valve. A temperature sensor is operatively coupled to the mixed output line and the controller, the controller being operative in response to the sensor to detect a temperature of the water in the mixed output line, compare a setpoint temperature to the detected temperature of the water in the mixed output line, and regulate a flow of one or both of cold water from the cold water input line and hot water from the hot water output line through the electronically controlled mixing valve to maintain the detected temperature at the setpoint temperature.

20 Claims, 4 Drawing Sheets

ELECTRONIC MIXING VALVE IN STANDARD HOT WATER HEATER

CROSS-REFERENCE TO RELATED APPLICATIONS

This application claims the benefit of U.S. Provisional patent application Ser. No. 61/675,014, filed on Jul. 24, 2012, the complete disclosure of which is expressly incorporated herein by reference in its entirety for all purposes.

BACKGROUND

The present disclosure generally relates to appliances, and more particularly to controlling hot water capacity and temperature in a water heater system.

Mixing valves in hot water heater systems are generally used to increase the hot water capacity of a hot water tank. By increasing the temperature of the hot water in the hot water tank, and then mixing the hot water flow from the hot water tank with cold water in a mixing valve, the realized capacity of the hot water tank is increased. Typical hot water systems that include a mixing valve generally seek to manage scalding risk and avoid temperature spikes that a user may experience without any interaction with a temperature control of the water heater.

The mixing valves for hot water heaters generally comprise a through-channel that is connected in series with a hot water supply line. A cold water inlet communicates with the through channel at an upstream side of a thermostat element. The thermostat element is located in the through-channel and functions to control the temperature of water passing from the mixing valve. A regulator valve element is located in a fluid passage between the cold water inlet and the through-channel. The regulator valve element is controlled by the thermostat element to regulate the quantity of cold water that is admitted into the through-channel to mix with the hot water.

The thermostat element that controls the regulator valve element of the mixing valve senses the temperature of the hot and cold water mix and controls the regulator valve element to provide a mix ratio which results in a pre-determined outflow temperature. The thermostat is typically adjustable to provide the pre-determined outflow temperature, also referred to herein as the hot water setpoint temperature. The mixing valve can detect the temperature of the water in the hot water supply line and introduce cold water into the hot water line when the hot water temperature is too high and reduce the temperature of the delivered water. However, these types of mixing valves can generally produce wide variations in the output temperature of the hot water that is delivered. It would be advantageous to be able to control an output of a mixing valve in a hot water system based on a user desired setpoint temperature for the hot water.

Water heaters are typically set to heat the water in the hot water tank to temperatures above approximately 120 degrees Fahrenheit. While a tank will typically have a limiting tank temperature of approximately 187 degrees Fahrenheit, it can be advantageous to be able to increase the temperature of the water in a hot water to temperatures of approximately 165 degrees Fahrenheit in order to reduce the probability of the occurrence of bacteria, such as *legionella* bacteria.

The typical hot water heater mixing valve is not capable of failure detection. If the mixing valve is faulty or the temperature is set too high, the temperature of the water delivered from the hot water heater can be too high. It would be advantageous to increase the hot water usability capacity of a hot water tank while minimizing the risks associated with the higher temperature hot water.

It can also be difficult to control the temperature of the hot water delivered from the hot water heater due to the mechanical nature of the mixing valve. With the typical mixing valve, a setpoint is chosen that approximates the desired hot water output temperature. It would be advantageous to be able to more precisely control the temperature of the hot water delivered from the hot water heater based on a desired user temperature setpoint.

Accordingly, it would be desirable to provide a hot water heater mixing valve that addresses at least some of the problems identified above.

BRIEF DESCRIPTION OF THE INVENTION

As described herein, the exemplary embodiments overcome one or more of the above or other disadvantages known in the art.

One aspect of the exemplary embodiments relates to a hot water heater. In one embodiment, the hot water heater includes a hot water tank having a cold water inlet line and a hot water outlet line, an electronically controlled mixing valve fluidly coupled to the cold water inlet line and the hot water outlet line. The electronically controlled valve provides a mixed output line. A controller is operatively coupled to the electronically controlled mixing valve. A temperature sensor is operatively coupled to the mixed output line and the controller, the controller being operative in response to the sensor to detect a temperature of the water in the mixed output line, compare a setpoint temperature to the detected temperature of the water in the mixed output line, and regulate a flow of one or both of cold water from the cold water input line and hot water from the hot water output line through the electronically controlled mixing valve to maintain the detected temperature at the setpoint temperature.

Another aspect of the exemplary embodiments relates to a method of controlling an electronically controlled mixing valve for a hot water heater, the electronically controlled mixing valve fluidly coupled to a cold water inlet line to the hot water heater and a hot water outlet line from the hot water heater, and providing a flow of water in a mixed output line. In one embodiment, the method includes detecting a temperature of water in the mixed output line, comparing the detected temperature to a setpoint temperature, and controlling, a flow of water from one or both of the cold water inlet line and hot water outlet line through the electronically controlled mixing valve to regulate the detected temperature of the water in the mixed outlet line to correspond to the setpoint temperature.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE DISCLOSURE

Figure 1:
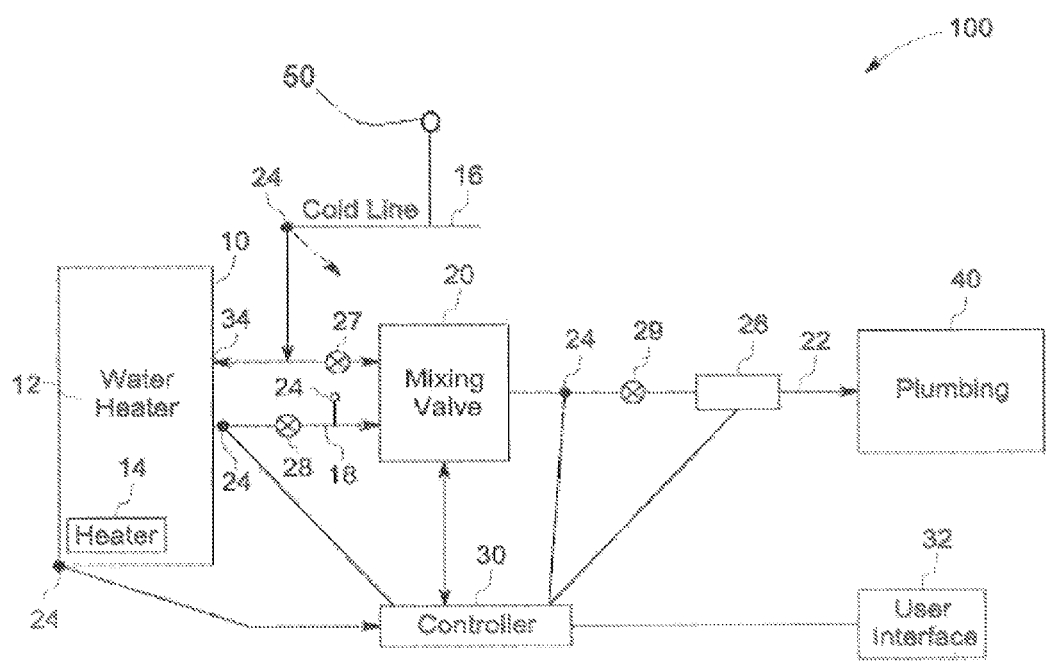
FIG. 1 is a schematic diagram of an exemplary hot water heater system incorporating aspects of the present disclosure.

Referring to FIG. 1, an exemplary hot water heater system incorporating aspects of the disclosed embodiments is generally designated by reference numeral 100. The aspects of the disclosed embodiments are directed to a hot water heating system that includes an electronic or electronically controlled mixing valve for a hot water heater system. The temperature of the water flow output from the hot water heater is detected, compared to a user desired temperature setpoint and the mixing valve is controlled to regulate the temperature accordingly. The aspects of the disclosed embodiments can provide more precise control of the desired temperature of the delivered hot water, detect a failure of the mixing valve as well as block the flow of hot water when the desired temperature setpoint is exceeded. Although the embodiments disclosed herein will be described with reference to the drawings, it should be understood that the embodiments disclosed can be embodied in many alternate forms. In addition, any suitable size, shape or type of elements or materials could be used.

As shown in FIG. 1, the hot water heater system 100 generally includes a hot water heater 10, an electronic mixing valve 20 and a controller 30. In the embodiment of FIG. 1, the hot water heater 10 includes a reservoir or water storage tank 12 for storing water and a heat source 14 for heating the water stored in the tank 12. The hot water heater system 10 includes an inlet 34 for receiving water from inlet line 16 for delivery into the tank 12. The water in the inlet line 16 is typically described as non-heated or "cold" water. The inlet line 16 is typically part of or connected to a water supply line for a home or building. The hot water heater system 10 also includes an outlet line 18 for supplying water from the tank 12 that has been heated to a pre-determined temperature, generally referred to herein as hot water. In the embodiment shown in FIG. 1, the outlet line 18 is coupled to the mixing valve 20. The mixing valve 20 receives non-heated water from the inlet line 16 and heated water from the outlet line 18 and mixes the heated water with the non-heated water to reduce the temperature of the water from the mixing valve 20 that is delivered to the plumbing system 40. The mixing valve 20 includes a mixed outlet or output line 22 that delivers the heated water resulting from the mixing to the portions of the plumbing system 40 to which the hot water heater 10 is connected, generally referred to herein as the hot water portions of the hot water system. The plumbing system 40 can be part of a residential, commercial or other water plumbing system that incorporates a hot water heater.

While the aspects of the disclosed embodiments can be applied to any system that incorporates a hot water heater 10, for the purposes of the description herein, such system will be described as a "plumbing system" or "home." The hot water heater 10 can be any suitable hot water heater including an electric, gas or hybrid hot water heater. In one embodiment, the heat source 14 can comprise an electric heating element such as a resistive-type heating element, a gas burner such as a propane or natural gas burner, a heat pump type of heater, or any other type of heat source.

As shown in FIG. 1, in this embodiment, the mixing valve 20 is fluidly connected to the inlet line 16 and the outlet line 18. The mixing valve 20 is coupled to the plumbing system 40 via the mixed output line 22. In one embodiment, the mixing valve 20 is an electronically controlled mixing valve and can include for example, a solenoid operated water valve and a gear or motor driven water valve. In alternate embodiments, any suitably controlled water mixing valve can be utilized to provide precise flow control such as for example, a servo or stepper motor coupled with a valve.

In the embodiment shown in FIG. 1, the controller 30 is an electronic controller that is operatively coupled to the hot water heater 10 and the mixing valve 20. In one embodiment, the controller 30 is configured to detect or determine the temperature of the water in the mixed output line 22 and control the flow of non-heated and heated water into the mixing valve 20 in order to regulate the temperature of the water being delivered from the mixed output line 22.

In one embodiment, the controller 30 comprises or is operatively coupled to, or is in communication with, one or more processor(s) that are operable to monitor and control the flow of hot water from the hot water tank 12 and heated water from the mixing valve 20, as well as execute the processes that are generally described herein. In one embodiment the controller 30 is comprised of machine-readable instructions that are executable by one or more processors or other suitable processing device(s). The processor(s) can include program code to perform particular tasks and/or data manipulations, as are generally described herein. In one embodiment, the processor(s) can include or be coupled to a memory and input/output devices. The memory typically comprises both volatile memory, such as semiconductor type random access memory, and volatile memory such as a magnetic computer disk.

As is shown in FIG. 1, in one embodiment, the controller 30 is operatively coupled to and between, and is communication with, the hot water heater 10 and the mixing valve 20. The controller 30 can also include or be coupled to a user interface 32. In one embodiment, the controller 30 and user interface 32 form part of a home energy management (HEM) system. The user interface 32 can comprise any suitable control or display that will allow a user to program, set and adjust the functions and settings of the hot water heater system 100, as are generally described herein. In one embodiment, the user interface 32 comprises a display interface, such as a touch screen display. In alternate embodiments, the user interface 32 can include buttons or switches for manipulating and programming the settings of the system 100, including for example the setpoint temperature. In one embodiment, the user interface 32 comprises or is part of a control panel for the hot water heater 10. The user interface 32 can also be located remotely from the hot water heater 10, and can be accessible through a computing device or a web based interface.

As is illustrated in FIG. 1, in one embodiment, the system 100 includes one or more sensors 24 for detecting and monitoring the temperature of the water in the different portions of the system 100. In the example of FIG. 1, sensors 24, such as thermistors, are shown on or thermally coupled to one or more of the inlet line 16, the outlet line 18, the mixed output line 22 and the hot water tank 12. The sensor(s) 24 are generally configured to provide one or more signals or commands to the controller 30 that will allow the controller 30 to detect and determine the temperature of the water in various portions of the hot water system 100.

In one embodiment, the sensors 24 are coupled to the controller 30 via a wired or wireless communication connection or interface. For purposes of the description herein, wireless communication connections and interfaces can include, but are not limited to, wireless radio, WiFi™, Bluetooth™, Zigbee™ and ethernet wireless type devices and interfaces.

In one embodiment, the aspects of the disclosed embodiments allow the temperature of the water in the storage tank 12 of the hot water heater 10 to be elevated above a typical standard setting of 120 degrees Fahrenheit, to for example, approximately 165 degrees Fahrenheit. By increasing the temperature of the water in the storage tank 12, the total volume of heated water delivered to the plumbing system at the desired temperature will be greater, since the non-heated or cold water, which in some cases can be on the order of approximately 58 degrees Fahrenheit, will be added to the heated or hot water from the tank to bring the temperature of the heated water delivered to the plumbing system 40 down to a required or pre-determined setpoint temperature. Thus, in effect, the effective capacity of a standard water heater is increased, without changing the size of the heater.

The aspects of the disclosed embodiments advantageously improve the volume of first hour delivery of hot water provided by a standard size 50 gallon hot water heater according to the first hour delivery test regulations set forth by the Department of Energy ("DOE"). According to these DOE first hour delivery test regulations, which are set forth in 10 CFR Part 430, a standard size 50 gallon hot water heater is required to produce a total flow of approximately 63 gallons of hot water at an output temperature of 135 degrees Fahrenheit over the course of a one-hour period.

As is described in more detail below, in a hot water system incorporating aspects of the disclosed embodiments, the volume of first hour delivery demonstrates an increase in the first hour delivery of approximately 17 to 23 gallons. Using the mixing valve DOE First Hour Delivery Improvement Estimator described below, an improvement of approximately 28% to 36% over the current DOE regulations for a standard size 50 gallon hot water heater can be realized.

Variable Definition

Qf=Hot water flow=3 GPM (per DOE requirements)

Ts=Temp setpoint mixing electric water heater=180 degrees Fahrenheit

Tc=Temp inlet water=58 degrees Fahrenheit (Per DOE requirements)

Tf=Temp Outlet=135 degrees Fahrenheit (Per DOE requirements)

Qs=Flow from SWH Storage Tank in gpm

Qc=Flow from Cold Water Supply in gpm

FHD of standard 50 gallon water heater=63 gallons

Total Flow Equation $$Qf = Qs + Qc$$

Mixing Equation:

$$(Qf \times Tf) = (Qs \times Ts) + (Qc \times Tc)$$

Substituting Qc=Qf−Qs gives the following:

$$(Qf \times Tf) = (Qs \times Ts) + ((Qf - Qs) \times Tc)$$

$$(Qf \times Tf) = (Qs \times Ts) + (Qf \times Tc) - (Qs \times Tc)$$

$$(Qf \times Tf) - (Qf \times Tc) = (Qs \times Ts) - (Qs \times Tc)$$

$$Qf \times (Tf - Tc) = Qs \times (Ts - Tc)$$

Or $$Qs = Qf \times [(Tf - Tc)/(Ts - Tc)]$$

IF

Qf=3 GPM per (DOE)

Ts=180 degrees Fahrenheit

Tc=58 degrees Fahrenheit (per DOE requirements)

Tf=135 degrees Fahrenheit (per DOE requirements)

Qs=1.89 (GPM)

Qc=1.11 (GPM)

Flow Mixture Hot=63%

Flow Mixture Cold=37%

Standard Electric FHD 63 GPM (given . . . GE 50 gallon standard electric water heater and 100% of the flow is hot water at 3 gpm)

FHD 86.24 GPM=63 GPM×137% since only 63% of the 3 gpm flow is hot water and 37% is cold water added to reach a total flow of 3 gpm.

For the purposes of this DOE test, the temperature setpoint (Ts) of the storage tank 12 is set to 180 degrees Fahrenheit. This is advantageous for example because the recommended minimum temperature setting of the storage tank 12 for addressing *Legionella* is 140 degrees Fahrenheit.

Thus, by increasing the temperature setting of the storage tank 12 of a hot water heater system 10 incorporating aspects of the disclosed embodiments, a first hour delivery increase of approximately 17 to 23 gallons of heated water can be realized. This is an improvement of approximately 28% to 36% over a standard 50 gallon hot water heater.

Figure 2:
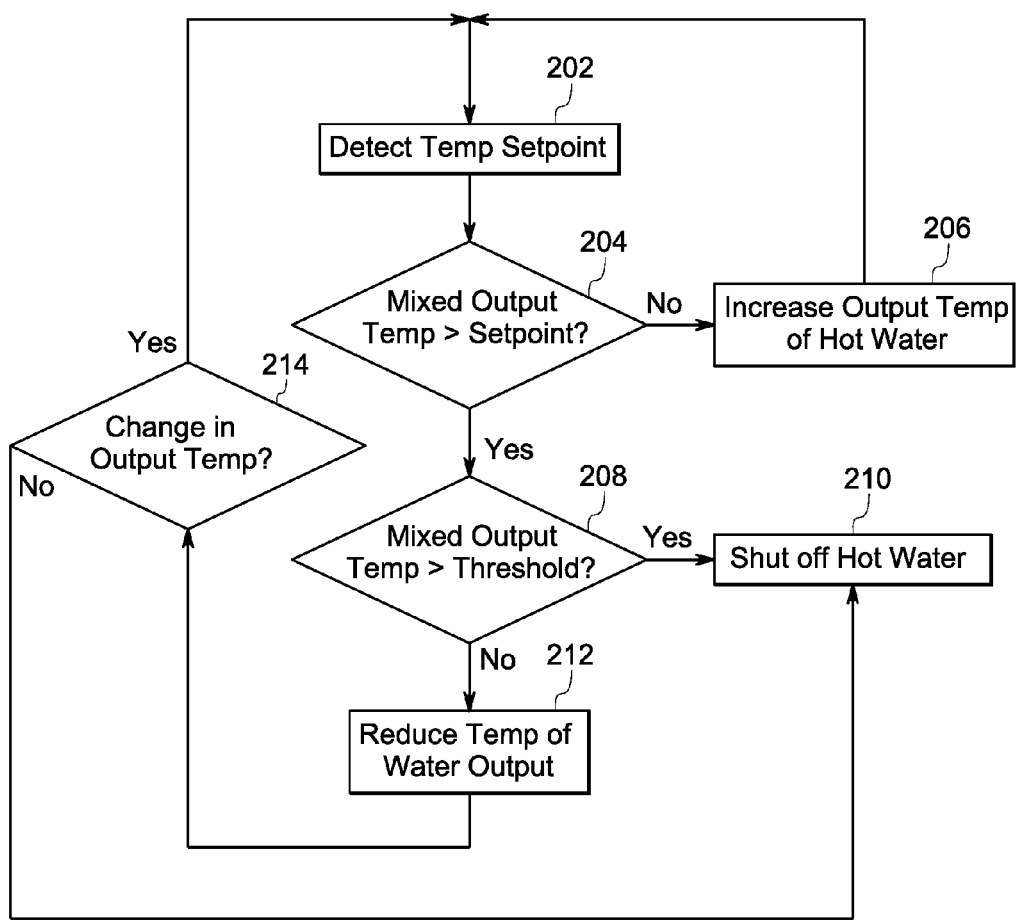
FIG. 2 is a flow chart illustrating an exemplary process flow incorporating aspects of the present disclosure.

Referring to FIG. 2, in one embodiment, the controller 30 is configured to detect 202 a desired hot water temperature setpoint, that can be set by the user using the user interface 32 referred to in FIG. 1. The controller 30 can compare 204 the temperature of the water in the mixed output line 22 to the detected temperature setpoint. The temperature setpoint can be stored in a memory, such as a memory of the controller 30, while the temperature of the water in the mixed output line 22 is detected by a sensor 24.

If the temperature of the water in the mixed output line 22 is not greater than the detected setpoint temperature, in one embodiment, the mixing valve 20 can be controlled to increase 206 the temperature of the water in the mixed output line 22. This can include, for example, regulating one or more valves 27, 28 that are part of or coupled to the mixing valve 20 to add more hot water from the tank 12 to the mixing valve 20 or reduce an amount of non-heated water from the inlet line 16 that is being supplied to the mixing valve 20.

If the temperature of the water in the mixed output line 22 is greater than the detected setpoint temperature, in one embodiment, it can first be determined 208 whether the temperature of the water in the mixed output line 22 exceeds a predetermined temperature threshold. If yes, the controller 30 can be configured to cause the mixing valve 20 to prevent 210 any further flow of hot water from the mixed output line 22. This can include closing valve 29 in the mixed output line 22 or valve 28 in the outlet line 18, or controlling valves internal to the mixing valve 20.

If the temperature of the water in the mixed output line 22 does not exceed a predetermined temperature threshold, in one embodiment, the controller 30 can be configured to reduce 212 the temperature of the water in the mixed output line 22. This can include for example, enabling more cold water to be added to the mixing valve 20 from the input line 16, or reducing the amount of heated water supplied to the mixing valve 20 from the outlet line 18. In one embodiment, this is accomplished by controlling one or more of valves 27, 28, or valves that are internal to the mixing valve 20.

In one embodiment, the regulation of the temperature in the mixed output line 22 can be used to determine if the mixing valve 20 is operating properly. For example, if the temperature of the water in the mixed output line 22 is determined to exceed the detected temperature setpoint, and a temperature change corresponding to commands sent by the controller 30 to the mixing valve 20 is not detected within a pre-determined amount of time, this can be indicative of a failure or malfunction of the mixing valve 20. For example, in one embodiment, it is determined that the temperature of the water in the mixed output line 22 exceeds the detected temperature setpoint, but not the pre-determined temperature threshold. As noted above, the controller 30 commands the mixing valve 20 to reduce the temperature of the water in the mixed output line 22. A determination 214 that a predetermined period of time has elapsed with little or no change in the temperature of the water in the mixed output line 22 can be indicative of a problem with the mixing valve 20, and the output of water from the mixing valve 20 can be shut off 210. In one embodiment, the controller 30 can also be configured to generate an error signal to indicate a problem with the mixing valve 20.

In one embodiment, the controller 30 is configured to control the heating of the water in the storage tank 12. The controller 30 can be configured to prevent further heating of the water in the storage tank 12 above a pre-determined temperature, such as 120 degrees Fahrenheit for example, to prevent a user from a potential scald risk, if a malfunction of the mixing valve 20 is detected. Thus, referring to FIG. 2, if it is determined 208 that the temperature threshold is exceeded, the controller 30 can shut the heat source 14 down.

Figure 3:
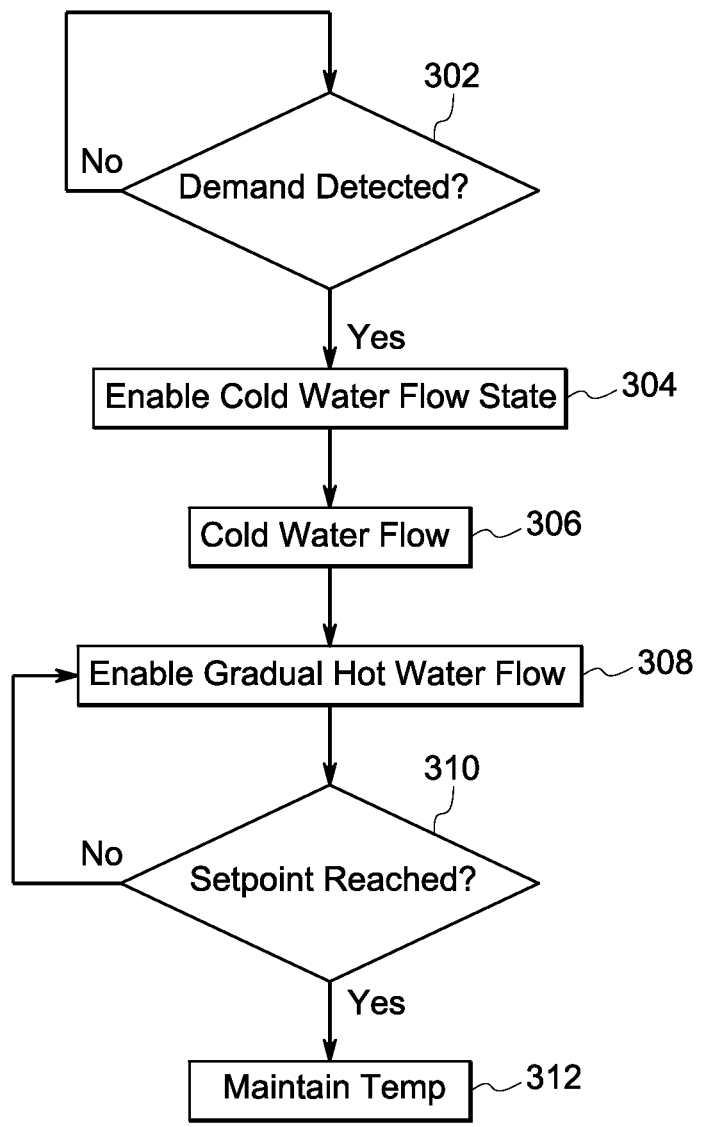
FIG. 3 is a flow chart illustrating an exemplary process flow incorporating aspects of the present disclosure.

Referring to FIG. 3, in one embodiment, when a demand for hot water is detected 302, the controller 30 can be configured to first enable 304 only a flow of cold water through the mixing valve 20 and into the mixed output line 22. The demand for hot water can be determined using, for example, a flow sensor 26 in the mixed output line 22. This initial flow of water from the input line 16 through the mixing valve 20 to the mixed output line 22 can correspond to an initial or home state or position of the mixing valve 20, where only the flow of non-heated or cold water is allowed through the mixing valve 20 to the mixed output line 22. Once the flow of cold water is established 306, in this embodiment, the controller 30 is configured to gradually enable 308 heated or hot water from output line 18 to be mixed with the cold water in the mixing valve 20 until it is detected 310 that the temperature of the water in the mixed outlet line 22 is at the desired temperature setpoint. The temperature of the water in the mixed output line 22 is maintained 312 at the setpoint temperature, such as by using the process described with respect to FIG. 2. When it is detected that the flow demand for hot water has stopped, the mixing valve 20 can return to the home state or position and close the hot water supply to the mixing valve 20.

In one embodiment, during a no-flow state, the mixing valve 20 can be set to a neutral state or position. In the neutral state, the output from the mixing valve 20, when flow demand is first detected, is configured to be warm at first, a mix of water from the input line 16 and the output line 18, and then transitioned to provide higher temperature water from the mixed output line 22 until the setpoint temperature is reached, in a manner similar to that described with respect to the process of FIG. 3. A "warm" temperature generally refers to a temperature that is defined to be approximately 50% of the temperature setpoint. In one embodiment, a "warm" temperature can be in the range of approximately 60 degrees Fahrenheit to and including 80 degrees Fahrenheit. In alternate embodiments, a "warm" temperature can be any desired temperature that is less than the temperature setpoint.

This neutral state or position of the mixing valve 20 can also be used to detect that the mixing valve 20 is operating properly. For example, in one embodiment, the controller 30 commands the mixing valve 20 to the neutral state. The temperature of the water in the mixed output line 22 is monitored during a flow event. If it is determined that the temperature transitions from a "warm" temperature towards the temperature setpoint, it is determined that the mixing valve 20 is operating properly. If not, it is determined that the mixing valve 20 is malfunctioning, and the flow of hot water stopped, as noted in FIG. 2.

Figure 4:
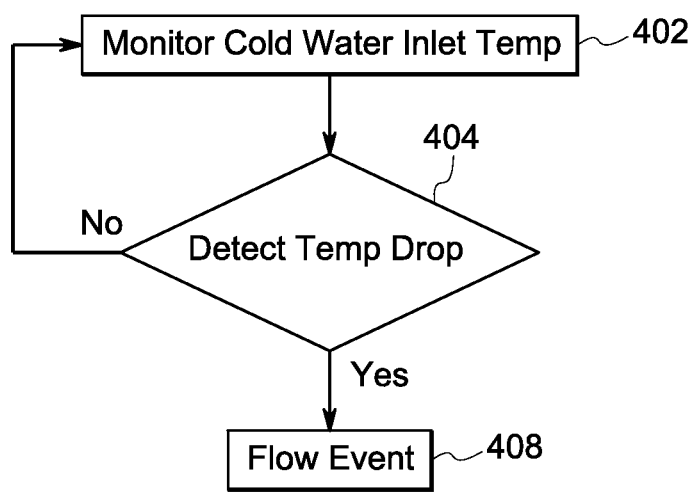
FIG. 4 is a flow chart illustrating an exemplary process flow incorporating aspects of the present disclosure.

Referring to FIG. 4, in one embodiment, the temperature of the water entering inlet 34 to the hot water tank 12 can be monitored 402 to determine a flow event. In this example, as shown in FIG. 1, a temperature sensor 50, communicatively coupled to the controller 30, can be thermally coupled to the inlet 34 or input line 16 near the inlet 34 to monitor a temperature of the inlet 34. During non-flow or standby periods, when hot water is not being consumed from the hot water tank 12, a temperature of the inlet 34 will be elevated due to conduction from the tank 12. While the temperature of the inlet 34 will be less than a temperature of the hot water stored in the tank 12, it will generally be higher than a temperature of the water in the input line 16 coming from the water supply. After a flow event starts, such as by a user turning on the hot water, or an appliance demand for hot water, the temperature of the inlet 34 will drop, generally rapidly, due to the temperature difference between the temperature of the non-heated water from input line 16 flowing into the tank 12 through inlet 34, and the temperature of the water in the tank 12. If a drop in temperature is detected 404, this is generally indicative of a flow event 408. In one embodiment, the change in temperature must exceed a pre-determined threshold change or delta, to signify a flow or no-flow event.

The system 100 and controller 30 of FIG. 1 are generally configured to utilize program storage devices embodying machine-readable program source code that is adapted to cause the apparatus to perform and execute the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips. The computer program or software incorporating the processes and method steps incorporating aspects of the disclosed embodiments may be stored in one or more computer systems or on an otherwise conventional program storage device.

The exemplary embodiments described herein provide a system for automatically regulating the temperature of hot water delivered from an electronically controlled mixing valve. By using an electronically controlled water mixing valve at the output of the hot water heater, the actual user desired or setpoint temperature at the output of the mixing valve can be more precisely controlled. This allows for the actual temperature of the water stored in the hot water heater to be increased above the desired output setpoint temperature. By being able to increase the temperature of the water stored in the hot water heater, the capacity of the hot water heater is effectively increased, since cold water will be mixed with the hot water to bring the temperature of the water to be delivered down to the desired temperature setpoint. Also, if the mixing valve fails, or water above the setpoint temperature is delivered, the aspects of the disclosed embodiments can shut the flow through the mixing valve as well as turn the hot water heater off.

Thus, while there have been shown and described and pointed out fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hot water heater system comprising:
a hot water tank having a heater, a cold water inlet line, and a hot water outlet line;
an electronically controlled mixing valve fluidly coupled to the cold water inlet line and the hot water outlet line;
a mixed output line from the electronically controlled mixing valve;
a controller operatively coupled to the electronically controlled mixing valve;
a temperature sensor operatively coupled to the mixed output line and the controller, the controller being operative in response to the sensor to:
detect a temperature of water in the mixed output line;
compare a setpoint temperature of a desired hot water temperature output to the detected temperature of the water in the mixed output line; and
regulate a flow of one or both of cold water from the cold water input line and hot water from the hot water output line through the electronically controlled mixing valve to maintain the detected temperature of the water in the mixed output line at the setpoint temperature; and
stop a flow of water from the mixed output line if a decrease in the detected temperature is not detected within predetermined time period.

2. The hot water heater system of claim 1, further comprising a water flow sensor in the mixed output line coupled to the controller, the controller being operative in response to the water flow sensor to:
detect a flow demand from the water flow sensor; and
set a state of the electronically controlled mixing valve to an initial cold water delivery state, wherein only cold water from the cold water inlet is enabled to flow through the electronically controlled mixing valve and enable a flow of hot water from the hot water outlet through the electronically controlled mixing valve until the detected temperature of the water from the mixed output line reaches the setpoint temperature.

3. The hot water heater system of claim 2, wherein the controller is operative in response to the water flow sensor to:
detect a no flow state from the water flow sensor; and
switch the state of the electronically controlled mixing valve to a home state that closes off flow of hot water through the mixing valve.

4. The hot water heater system of claim 2, further comprising a cold water inlet to the hot water tank on the cold water inlet line, a temperature sensor thermally coupled to the cold water inlet configured to detect a temperature of the cold water inlet, the controller being operative in response to the temperature sensor to:
detect a change in temperature of the cold water inlet; and
switch the state of the electronically controlled mixing valve to the initial cold water delivery state when the change exceeds a predetermined threshold.

5. The hot water heater system of claim 1, further comprising a temperature sensor in the hot water outlet line and the hot water tank, each temperature sensor being coupled to the controller, the controller being operative in response to each temperature sensor to:
compare a temperature of water in the hot water outlet line to the setpoint temperature and the detected temperature of water in the mixed output line; and
regulate a flow of one or both of the cold water and hot water through the electronically controlled mixing valve to maintain the detected temperature at the setpoint temperature.

6. The hot water heater system of claim 1, wherein the controller is operative in response to the temperature sensor to:
determine that the detected temperature of the water in the mixed output line exceeds a pre-determined temperature; and
disable a heating of water in the hot water tank.

7. The hot water heater system of claim 1, wherein the controller is operative in response to the temperature sensor to:
determine that the detected temperature of the water in the mixed output line exceeds a pre-determined temperature; and
enable only a flow of cold water from the cold water inlet line through the electronically controlled mixing valve.

8. The hot water heater system of claim 1, wherein the electronically controlled mixing valve comprises a servo or stepper motor coupled with a water valve.

9. A method for controlling an electronically controlled mixing valve for a hot water heater, the electronically controlled mixing valve fluidly coupled to a cold water inlet line to the hot water heater and a hot water outlet line from the hot water heater, and providing a flow of water in a mixed output line, the method comprising:
detecting a temperature of water in the mixed output line;
comparing the detected temperature to a setpoint temperature;
controlling a flow of water from one or both of the cold water inlet line and hot water outlet line through the electronically controlled mixing valve to regulate the detected temperature of the water in the mixed output line to correspond to the setpoint temperature; and stopping the flow of water from the mixed output line if a decrease in the detected temperature is not detected within a pre-determined time period.

10. The method of claim 9, further comprising:
detecting a flow state of hot water from the hot water tank;
setting a state of the electronically controlled mixing valve to an initial cold water state;
enabling an initial flow of cold water from the cold water inlet line through the mixing valve and to the mixed output line; and enabling a flow of hot water from the hot water outlet line through the mixing valve until the setpoint temperature is reached in the mixed output line.

11. The method of claim 10, further comprising:
detecting no-flow state of the hot water from the hot water tank; and
setting the state of the electronically controlled mixing valve to prevent a flow of hot water from the hot water inlet line through the mixing valve.

12. The method of claim 11, further comprising:
detecting a change in temperature of the cold water inlet; and
determining the flow state or no flow state when the detected change in temperature exceeds a predetermined threshold.

13. The method of claim 12, wherein the flow state is determined when the detected change in temperature is a decrease in temperature and the no flow state is determined when the detected change in temperature is an increase in temperature.

14. The method of claim 9, wherein controlling the flow of water through the electronically controlled mixing valve comprises:
regulating the flow of cold water and hot water through the electronically controlled mixing valve so that the detected temperature of the water in the mixed output line is in a warm state; and
increasing the flow of hot water through the electronically controlled mixing valve until the detected temperature is the setpoint temperature.

15. The method of claim 9, further comprising:
determining that the detected temperature of the water in the mixed output line exceeds a pre-determined temperature; and
disabling a heating of water in the hot water tank.

16. The method of claim 9, further comprising:
determining that the detected temperature of the water in the mixed output line exceeds a pre-determined temperature; and
enabling only a flow of cold water from the cold water inlet line through the electronically controlled mixing valve.

17. A hot water heater control system comprising:
a hot water heater;
a mixing valve coupled to an output of the hot water heater, the mixing valve including a non-heated water input and a heated water input and a mixed water output;
a temperature control configured to enable setting of a temperature setpoint of the mixed water output;
a controller coupled to the mixing valve and the temperature control and configured to control the mixing valve to regulate a temperature of the mixed water output to be at the setpoint temperature; and
wherein the controller is configured to:
detect the temperature of the mixed water output;
determine if the detected temperature exceeds a pre-determined temperature threshold;
control the mixing valve to reduce a temperature of the mixed water output if the detected temperature exceeds a pre-determined temperature threshold; and
stop a flow of water from the mixing valve if a decrease in the detected temperature is not detected within a pre-determined time period.

18. The hot water heater control system of claim 17, wherein the controller is configured to control the mixing valve to increase a temperature of the mixed water output if the detected temperature is below the pre-determined temperature threshold.

19. The hot water heater control system of claim 18, wherein the controller is configured to:
detect a water flow event;
set a state of the mixing valve to a first position to enable a flow of non-heated water through the mixing valve;
determine that the temperature of the mixed water output is below the setpoint temperature;
set the state of the mixing valve to a second position to enable an increasing flow of heated water through the mixing valve until the temperature of the mixed water output is determined to be at the setpoint temperature; and
set the state of the mixing valve to the first position at an end of the water flow event.

20. The hot water heater control system of claim 19, further comprising a water inlet to the hot water heater tank coupled to the non-heated water input, a temperature sensor coupled to the water inlet, and wherein the controller is configured to detect a flow event by determining that a temperature of the water inlet decreased by a pre-determined temperature amount within a pre-determined time period.

* * * * *